Patented Aug. 20, 1935

2,011,807

UNITED STATES PATENT OFFICE 2,011,807

PROCESS FOR SEPARATING MIXTURES OF ISOMERIC VAT DYESTUFFS OF THE 1.4.5.8-NAPHTHOYLENE DIARYLIMIDAZOLE SERIES INTO THEIR COMPONENTS AND THE DYESTUFFS OBTAINED THEREBY

Wilhelm Eckert and Walter Gmelin, Frankfort-on-the-Main-Hochst, Germany, assignors to General Aniline Works, Inc., New York, N. Y., a corporation of Delaware No Drawing. Application April 29, 1933, Serial No. 668,664. In Germany May 4, 1932

8 Claims. (Cl. 260—44)

The present invention relates to a process of separating mixtures of isomeric vat dyestuffs of the 1.4.5.8-naphthoylene diarylimidazole series into their components and to the dyestuffs obtained thereby.

We have found that mixtures of isomeric vat dyestuffs which are obtainable by condensing a 1.4.5.8-naphthalene-tetracarboxylic acid compound with an ortho-diamino-compound and which have the general formula:

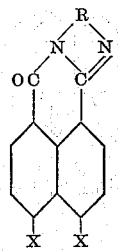

wherein the two X's jointly represent the bivalent group

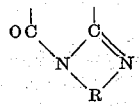

and R means an arylene radical bound to the nitrogen atoms in ortho-positions may be separated very easily and with a good yield into their components by treating them in the presence or absence of an inert solvent or a suspension agent with a suitable metal chloride and separating from each other the new derivatives thus formed which may be addition compounds or perhaps complex compounds, by taking advantage of their different solubilities. After the separation, the components may be converted into the dyestuffs proper by treatment with water or dilute mineral acids. As solvents there may be used, for instance, glacial acetic acid, nitrobenzene or the like and as suitable metal salts there may be used zinc chloride, aluminium chloride, tin tetra-chloride, antimony tri-chloride, antimony penta-chloride or the like.

The following examples serve to illustrate the invention but they are not limited thereto, the parts being by weight, unless otherwise stated:

(1) 5 parts of the mixture of isomeric dyestuffs obtainable by condensation of 1.4.5.8-naphthalene-tetra-carboxylic acid with ortho-phenylenediamine, for instance, by heating the two substances in nitrobenzene, are stirred at about 50° C. to about 60° C. for 2-3 hours with 7 parts of aluminium chloride in 50 parts of dry nitrobenzene. There are soon formed the brown-yellow addition compounds of the isomeric dyestuffs with aluminium chloride one of which separates in the form of crystals whilst the other dissolves. After cooling to 10° C., the whole is filtered with suction and the solid matter is washed with a small quantity of nitrobenzene. The mass remaining on the filter is then stirred with alcohol whereby the greater part of the addition compound is decomposed. The whole is filtered with suction and, in order to complete the decomposition, the solid matter is washed with dilute hydrochloric acid and then with water and dried. The dyestuff thus obtained dyes cotton from a dark green vat orange tints.

From the nitrobenzene-filtrate the isomeric dyestuff is obtained by removing the nitrobenzene by distillation with steam and adding a small quantity of hydrochloric acid, in order to entirely split off the aluminium chloride; the whole is filtered with suction and the solid matter is washed until neutral and dried. The dyestuff thus obtained dyes cotton bluish-red tints.

(2) 10 parts of the dyestuff mixture of isomeric 1.4.5.8-naphthoylene-4'.5'.4".5"-tetrachloro-diphenylimidazoles, obtainable, for instance, by condensation of 1.4.5.8-naphthalene-tetracarboxylic acid or the anhydride thereof with 1.2-diamino-4.5-dichlorobenzene, are suspended in about 100 parts by volume of dry nitrobenzene and about 13 parts of tin tetra-chloride are added thereto. The whole is heated for 2-3 hours at 50° C. to 60° C., allowed to cool and the difficultly soluble addition product of the one isomeric dyestuff with tin tetra-chloride which has been formed is filtered with suction, washed with a small quantity of nitro-benzene and then with alcohol. By introducing this addition product or the complex compound, respectively, into water or a dilute mineral acid, it is hydrolyzed whereby the dyestuff of the following probable formula is obtained:

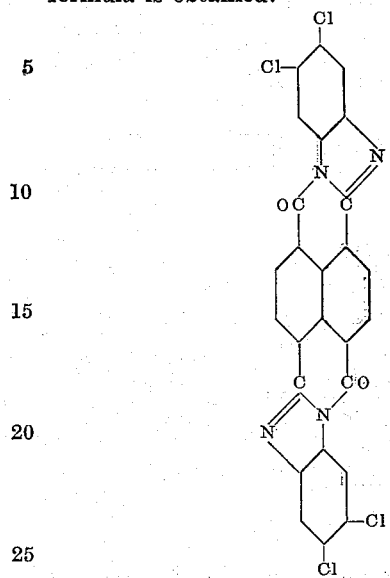

It forms an orange-red powder which dissolves in concentrated sulfuric acid to a yellow-red solution and dyes the vegetable fiber from an olive-green vat very clear orange tints of very good fastness properties.

In order to obtain the isomeric dyestuff:

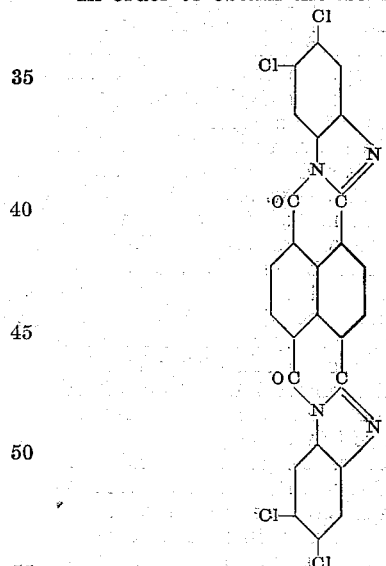

the nitrobenzene-filtrate is distilled with steam; to the remaining aqueous solution hydrochloric acid is added and the whole is heated for a short time on the water-bath. The dyestuff formed is filtered with suction, washed until neutral and dried. It forms a blue-red powder which dyes the vegetable fiber Bordeaux-red tints.

(3) 20 parts of the mixture of isomeric dyestuffs which have the following probable formula:

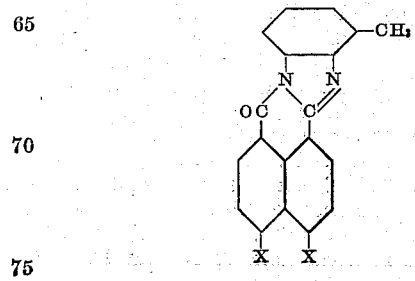

wherein the two X's jointly represent the bivalent group

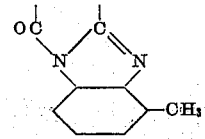

and may be obtained by condensation of 1.4.5.8-naphthalene-tetracarboxylic acid, or the anhydride thereof, with 2.3-diamino-toluene are suspended in about 180 parts by volume of dry nitrobenzene; about 25 parts of antimony trichloride are added and the whole is heated at 70° C. to 80° C. for some hours. After the formation of the respective feebly-brown addition products, the whole is allowed to cool and the product is worked up as described in Example 2.

The dyestuff which may be obtained by hydrolysis from the difficultly soluble addition product dyes the vegetable fiber from an olive-green vat very clear yellowish scarlet tints. The dyestuff obtainable from the easily soluble addition product in the filtrate dyes the vegetable fiber Bordeaux tints.

We claim:

1. The process which comprises treating a mixture of isomeric dyestuffs of the general formula:

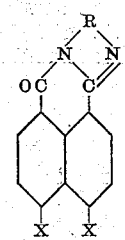

wherein the two X's jointly represent the bivalent group:

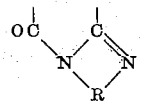

and R means an arylene radical of the benzene series bound to the nitrogen atoms in ortho-positions, with a metal chloride of the group consisting of zinc chloride, antimony pentachloride, antimony trichloride, aluminium chloride and tin tetra-chloride and separating the mixture of isomeric compounds thus obtained into its components by taking advantage of their different solubilities.

2. The process which comprises treating a mixture of isomeric dyestuffs of the general formula:

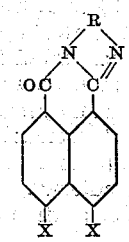

wherein the two X's jointly represent the bivalent group:

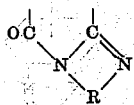

and R means an arylene radical of the benzene series bound to the nitrogen atoms in ortho-positions, with a metal chloride of the group consisting of zinc chloride, antimony pentachloride, antimony trichloride, aluminium chloride and tin tetra-chloride in the presence of an inert organic diluent and separating the mixture of isomeric compounds thus obtained into its components by taking advantage of their different solubilities.

3. The process which comprises heating for some hours at a temperature of about 50° C. to about 80° C. a mixture of isomeric dyestuffs of the general formula:

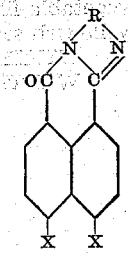

wherein the two X's jointly represent the bivalent group:

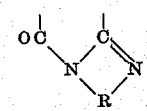

and R means an arylene radical of the benzene series bound to the nitrogen atoms in ortho-positions, with a metal chloride of the group consisting of antimony trichloride, aluminium chloride and tin tetra-chloride in the presence of an inert organic diluent and separating the mixture of isomeric compounds thus obtained into its components by taking advantage of their different solubilities.

4. The process which comprises heating for some hours at a temperature of about 50° C. to about 60° C. a mixture of isomeric dyestuffs of the formula:

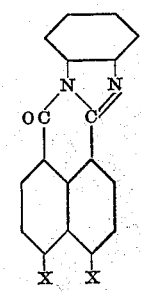

wherein the two X's jointly represent the bivalent group:

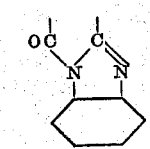

with aluminium chloride in the presence of nitrobenzene and separating the mixture of isomeric compounds thus obtained into its components by taking advantage of their different solubilities.

5. The process which comprises preparing addition compounds by stirring for 2 to 3 hours at a temperature of about 50° C. to about 60° C. a mixture of two isomeric dyestuffs of the formula:

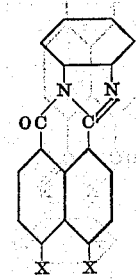

wherein the two X's jointly represent the bivalent group:

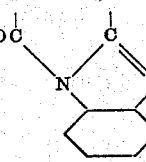

with aluminium chloride and nitrobenzene, separating the solid product thus obtained, representing the one isomeric addition compound from the solution containing the other isomeric addition compound and individually decomposing the addition compounds to the dyestuffs proper by treating the above solid addition compound with alcohol and diluted hydrochloric acid, and by subjecting the above solution of the other addition compound to a steam-distillation, in order to remove the nitrobenzene, and to a treatment with dilute hydrochloric acid.

6. The compounds of the following formula:

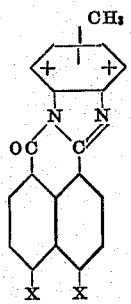

wherein the two X's jointly represent the bivalent group

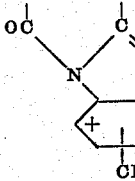

and the CH₃-group stands in one of the positions +, dyeing the vegetable fiber from a green vat 7. The compound of the formula:
wherein the CH₃-group stands in one of the positions +, dyeing the vegetable fiber from a green vat Bordeaux tints.
8. The compound of the formula:
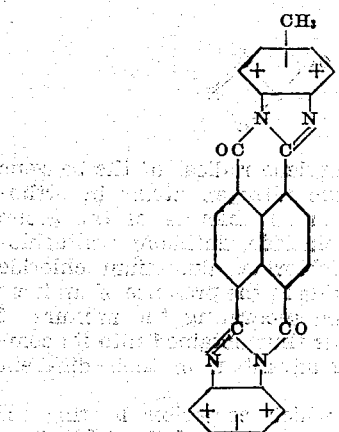
wherein the CH₃-group stands in one of the positions +, dyeing the vegetable fiber from an olive green vat very clear yellowish scarlet tints.
WILHELM ECKERT.
WALTER GMELIN.